3,402,147
PROCESS FOR PREPARING POLYESTER
RESINS FROM A TELOMER
Werner Starck, Hofheim, Taunus, Jakob Winter, Kelkheim, Helmut Rinno, Lorsbach, Taunus, and Wilhelm Lampe, Hofheim, Taunus, Germany, assignors to Farbwerke Hoechst Aktiengesellschaft vormals Meister Lucius & Brüning, Frankfurt am Main, Germany
No Drawing. Filed Jan. 21, 1964, Ser. No. 339,084
Claims priority, application Germany, Jan. 22, 1963, F 38,818
13 Claims. (Cl. 260—75)

The present invention relates to polyester resins and to a process for preparing them.

It is known that polyester resins having a sufficiently high acid number yield salts that are soluble in water. As starting substances for making such products there have been used aromatic carboxylic acids with more than one carboxyl group, fatty acids and polyfunctional alcohols. The resins are condensed to such an extent that a sufficiently high number of free carboxyl groups is retained (acid number above 40), in order that aqueous solutions of their salts can be prepared after neutralization with alkali metal hydroxides, ammonia or amines. It has repeatedly been proposed to use aqueous resin solutions of this kind as binder or as raw material for producing varnish coatings on porous and nonporous materials. By a baking process the water-soluble resins are transformed into water-insoluble films.

The present invention provides polyester resins the salts of which are soluble in water and a process for preparing the said resins using telomers containing carboxyl groups or carboxylic anhydride groups. It has surprisingly been found that the novel products are superior as to their important utilitarian properties to the known water- soluble polyester resins made from aliphatic or aromatic polycarboxylic acids. When telomers from maleic anhydride and styrene are used in the process of the invention water soluble binders are obtained which are very stable in storage and highly compatible with pigments. Films obtained from these products after baking are extremely fast to water and elastic and possess a good adherence, for example on metal sheets.

The telomers used as starting materials and containing carboxyl groups or carboxylic anhydride groups have a medium molecular weight of 400 to 2,000, preferably 500 to 1,000, and contain on the average 3 to 12 and advantageously 4 to 10 carboxyl groups or a corresponding number of carboxylic anhydride groups in the molecule. Telomers containing carboxyl as well as carboxylic anhydride groups may likewise be used. However, the number of 12 carboxyl groups on the average shall not be exceeded, one carboxylic anhydride group being equivalent to two carboxyl groups. Besides of the tolegen fractions incorporated as terminal groups the telomers may solely consist of structural units containing carboxyl groups and/or carboxylic anhydride groups, for example acrylic acid, methacrylic acid, itaconic acid, maleic acid, maleic acid semiester or maleic anhydride. There are likewise suitable telomers containing as structural units ethylenically unsaturated compounds being free from carboxylic anhydride groups and free carboxyl groups such as ethylene, propylene, butylene, advantageously methacrylic acid methyl ester, diisobutylene, α-methylstyrene and styrene, in addition to the telogen fractions incorporated as terminal groups and the structural units containing carboxyl and/or carboxylic anhydride groups, such as acrylic acid, methacrylic acid, itaconic acid, preferably maleic acid, maleic acid semiesters and particularly maleic anhydride. The maleic acid semiester units eventually contained in the telomers are semiesters of maleic acid and aliphatic saturated monohydric alcohols with 1 to 6 carbon atoms or ethylene glycol monoalkyl ethers with 3 to 6 carbon atoms altogether.

The telomers can be prepared, for example, by the processes and from the telogens disclosed in the following publications:

(1) C. E. Rehberg and J. Siciliano, Ind. Eng. Chem. 44 (1952), 2869–66;
(2) K. Thinius and W. Thümmler, "Plaste und Kautschuk, 6 (1959), 314–321;
(3) Belgian Patent 591,614, and
(4) Belgian Patent 604,029.

In order to prepare the telomers required in the process of the invention and having an especially low molecular weight there must be used high reaction temperatures in the range of from 140° C. to 200° C., high catalyst concentrations of for example 0.5 to 5%, calculated on the weight of the monomers and superatmospheric pressure depending on the vapor pressure of telogen and monomers. The telogen simultaneously serves as solvent or diluent. Suitable telogens are from among the telogens mentioned in the processes specified above, particularly high boiling aromatic hydrocarbons carrying secondary or tertiary hydrogen atoms in the side chain, such as cumene, diethylbenzene, diisopropylbenzene and triisopropylbenzene.

The monomers and the peroxide used to initiate the reaction are preferably introduced simultaneously by way of a metering device into the telogen heated to the reaction temperature so that too vigorous a reaction is avoided. Gaseous monomers are forced into the reaction zone under pressure.

The telomers used as starting products in the process of the invention can likewise be prepared from the intermediary products obtained by the processes referred to above. A telomeric acrylic acid can be obtained by saponification for example, from a telomeric acrylic acid ester synthetized according to a process as taught in reference (1) or (2). Suitable starting products containing maleic acid or maleic acid semiester structural units may also be produced, for example, from telomers containing maleic anhydride radicals by reacting them with alcohols or with water.

Besides the telomers containing carboxyl groups and/or carboxylic anhydride groups there are used for the manufacture of the resins according to the invention dicarboxylic acids or the anhydrides thereof, particularly dicarboxylic acids and the anhydrides thereof having up to 10 carbon atoms, for example phthalic acid, phthalic anhydride, isophthalic acid, terephthalic acid, maleic acid, maleic anhydride, advantageously adipic acid and sebacic acid. As alcohol components are used diols, especially diols with 2 to 8 carbon atoms such as ethylene glycol, propylene glycol, butylene glycol, hexanediol, 2,2-dimethylpropanediol-(1,3), or 1,4-bis[hydroxymethyl]cyclohexane. In the total mixture the ratio of COOH groups to OH groups shall vary within the range of 1:1 to 1:1.5, preferably 1:1 to 1:1.2. It is possible, of course to use the components for making the novel polyester resins also in the form of mixtures, for example ethylene glycol may be used in admixture with 1,4-bis[hydroxymethyl]cyclohexane or adipic acid in admixture with maleic anhydride. 20 to 85% and preferably 40–80% of the total amount of carboxyl groups present in the starting substances shall be contained in the telomers having carboxyl groups and/or carboxylic anhydride groups, and at least 15% of the carboxyl groups present in the starting substances shall be contained in the dicarboxylic acids used, one anhydride group being equivalent to two carboxyl groups.

In order to produce resins having special properties there may be used as starting materials, besides the three components defined above, alcohols or carboxylic acids with one hydroxyl or carboxyl group or with 3 to 6 hydroxyl or carboxyl groups in an amount such that up to 20% of the hydroxyl or carboxyl groups present in the starting substances originate from these compounds. When, for example compounds having one hydroxyl or one carboxyl group such as butanol, dodecyl alcohol, ethylene glycol monobutyl ether, fatty acids of linseed oil or benzoic acid are concomittantly used undesired cross linking reactions may be suppressed or when compounds having long aliphatic radicals are incorporated the elasticity of the baked films is improved. The additional use of alcohols or acids having more than two functional groups such as glycerol, trimethylolpropane, citric acid, mellitic acid or the like permits the manufacture of resin solutions of very high viscosity.

The polyester resins are produced from the starting substances according to known methods at elevated temperature. The water formed in the esterification is directly removed by distillation, expelled with the aid of an inert gas or distilled off as an azeotrope with the use of an entrainer such as xylene or toluene. The use of known esterification catalysts such as zinc, copper, iron and zirconium salts or salts of manganese-II often reduces the reaction time, it is, however, not critical. The esterification is preferably carried out at a temperature in the range of 100° C. to 190° C. The esterification is accomplished to such an extent that after neutralization of the free carboxyl groups with ammonia or an organic amine aqueous solutions having a solids content of at least 20% can be prepared. In general, this can be done with resins having an acid number of at least 40.

However, to obtain products yielding water-proof films on baking within an industrially practicable period of time, it is necessary that the products be esterified to a sufficiently large extent during the resin production. Therefore, the acid number shall not exceed the value of 140. The viscosity of the resin solutions or resin melts increases as the acid number decreases. By using suitable telomeric starting products it is possible, however, to produce resins having a high acid number and a high viscosity and resins having a low acid number and a relatively low viscosity, depending on whether telomers with a high or low number of functional groups are used.

After having reached the desired acid number and viscosity the melt of the resin is cooled, for example to 60–95° C., water is added and the whole is neutralized with ammonia or an amine to produce the aqueous solution. Suitable amines, are, for example, primary, secondary and tertiary, aliphatic or cycloaliphatic amines, especially those with up to 6 carbon atoms such as methylamine, dimethylamine, triethylamine, butylamine or amines still carrying a hydroxyl group, for example 2-aminoethanol or diethylaminoethanol. It is likewise possible to use for neutralization additionally amines having long chain aliphatic radicals, such as stearyl amine, in an amount not exceeding 5%, calculated on the amount of resin, if the solubility in water is not reduced too much. Additions of this kind favourably influence the surface tension of the aqueous solutions. After the addition of water and neutralization residues of organic solvent which may still be present and may have been used as entrainer in the esterification can be distilled off together with part of the water. Alternatively, the resin solution can be prepared by first cooling the resin, comminuting it and then introducing it into a mixture of water and ammonia. Still further, the resins can be first neutralized by adding an amine or introducing ammonia and the aqueous solution can then be prepared from the salt.

The aqueous solutions of the resins according to the invention can be used, for example, as water-soluble lacquer raw materials, as binding agents and impregnating agents. They can be applied according to a known method by brushing, dipping or spraying, depending on the type of material to be coated or impregnated. By heating at temperatures in the range of from 100° C. to 220° C., preferably 120° C. to 180° C. water-insoluble films are formed the properties of which, such as hardness, elasticity, resistance to solvents and hot water can be varied by the selection of the starting substances for the manufacture of the resin.

The polyester resins of the invention, which have not yet been neutralized with ammonia or amines, are soluble in alcohols, ketones, esters and aromatic hydrocarbons. They can be applied to the materials to be treated in the form of these solutions, too. After baking there are likewise obtained water-proof coatings.

The following examples serve to illustrate the invention but they are not intended to limit it thereto, the parts being by weight unless otherwise stated.

Example 1

168 parts of ethylene glycol, 98 parts of maleic anhydride and 216 parts of a telomer of α-methylstyrene and maleic anhydride (molar ratio 1:1) having a molecular weight of 550–650 were heated to 150° C. After a short period of time a limpid melt was obtained. The water formed in the subsequent esterification was expelled from the reaction vessel by a weak current of nitrogen. In order to avoid losses of unreacted ethylene glycol the steam/nitrogen mixture was passed through a reflux condenser the jacket of which was heated at 100° C. by means of steam. After a reaction period of 8 hours the acid number had dropped to 100. The resin was cast on to metal sheets and cooled.

100 parts of resin were neutralized in 100 parts of water with a 25% $NH_3$ solution to a pH of 6.5 to 7.0. A limpid solution was obtained which could be diluted with water.

Example 2

800 parts of xylene and 202 parts of a telomer of styrene and maleic anhydride (molecular weight about 1500, molar ratio 1:1) were boiled for 4 hours with reflux with 130 parts of dodecyl alcohol. 78 parts of propanediol-(1,2) and 42 parts of adipic acid were added to the limpid solution. Esterification was brought about at an internal temperature of 125 to 140° C. using a water separator. The xylene distilling off and the water formed in the esterification were withdrawn from the water separator at a rate such that at the end of the reaction the resin only contained small amounts of solvent. After about 17 hours the acid number had dropped to 60. The esterification was interrupted, the resin was cooled to 100° C. and, while vigorously stirring, 600 parts of water and a 25% $NH_3$ solution were added until a pH of 6.5–7.5 had been reached. The excess xylene was removed from the dispersion formed by azeotropic distillation under reduced pressure. As final product a limpid highly viscous yellow resin solution was obtained which was miscible with water. The product was used as binder in aqueous lacquer systems and waterproof elastic films were obtained.

Example 3

152 parts of propanediol-(1,2) were stirred at 140–150° C. with 40.4 parts of a telomer of styrene and maleic anhydride (molar ratio 1:1, molecular weight about 1200) until a limpid solution was obtained. 220 parts of phthalic anhydride were melted at the same temperature with the solution obtained. 300 parts of toluene were added and the mixture was esterified for 10 hours at 110–125° C. while using a water separator. After said time the acid number was about 140. The solution was cooled to 80° C. and 25 parts of 2-aminoethanol and 350 parts of water were dropped in. The toluene was distilled off in the form of an azeotrope with part of the water. After the addition of a 25% ammonia solution to pH of 6.5 to 7 a limpid solution was obtained which could be diluted with water.

Example 4

202 parts of a telomer of maleic anhydride and styrene (molar ratio 1:1, molecular weight 450–600 were melted at 140° C. with 208 parts of 2,2-dimethylpropanediol-(1,3) and 82 parts of adipic acid. Toluene was added and esterification was brought about by heating for about 25 hours at 110–125° C. The water formed in the reaction was distilled off together with the toluene and separated in a water separator. The esterification was interrupted as soon as the acid number had dropped to 90.4 parts of stearyl amine, 300 parts of water and 65 parts by volume of a 25% ammonia solution were added and the toluene was distilled off with part of the water under a pressure of about 50 mm. of mercury. The turbid resin solution was adjusted to pH 6.4 to 7.0 by adding a 25% ammonia solution. A limpid solution was obtained which could be diluted with water to a concentration of 15% without turbidity occuring.

Example 5

A resin having an acid number of 70–85 was prepared as described in Example 4 from 202 parts of a telomer of styrene and maleic anhydride (molar ratio 1:1, molecular weight 450–600), 82 parts of adipic acid and 158 parts of propanediol-(1,2). 300 parts of water and 50 parts by volume of a 25% ammonia solution were added to prepare the aqueous solution. The toluene serving as entrainer in the esterification was distilled off with part of the water under a pressure of about 50 mm. of mercury. The pH of the solution was adjusted to 6.2–6.9 by adding a 25% ammonia solution. A limpid resin solution was obtained which could be completely mixed with water. The solution obtained was excellently suitable for making baking lacquers miscible with water.

A mixture of 30 parts of 50% resin solution
15 parts of iron oxide red
15–20 parts of magnesium silicate
2–5 parts of barium sulphate was stable for several months without change of viscosity. After that time it could still be diluted with water without addition of organic solvent. The priming lacquer was applied to degreased metal sheets in suitable manner by brushing or dipping and the sheets were heated for 30 minutes at 150° C. The films obtained were very elastic and waterproof and had a good adherence to the sheets. Values of 9 to 10 mm. were reached in the indentation test according to Erichsen. After a storage time of 10 days in water a damage of the coating could not be observed. The hardness of the film was so high that it could be ground in the wet state.

Example 6

A polyester resin was prepared as described in Example 4 from 104 parts of a telomer of diisobutylene and maleic anhydride (molar ratio 1:1, molecular weight 780), 90 parts of butanediol-(1,3) and 113 parts of sebacic acid. The esterification was interrupted as soon as an acid number of 55–60 had been reached. 200 parts of water and a 25% ammonia solution were added to prepare a limpid solution having a pH value in the range of from 6.5 to 7.5 and capable of being mixed with water.

Example 7

100 parts of a telomer of styrene and maleic anhydride (molecular weight 700–750, molar ratio 1:1), 40.5 parts of adipic acid, 60 parts of butanediol-(1,4) and 27 parts of butylglycol were melted and the mixture was esterified in a stirring flask at 140° C. until an acid number of 110 had been reached. The water formed in the reaction was removed from the reaction vessel by a nitrogen current.

The polyester resin was cooled to 80° C. and dissolved by adding 100 parts of water, 17 parts of diethylaminoethanol and 10 parts of a 25% aqueous ammonia solution. Ammonia solution was then added until a pH value of 6.8–7.5 had been reached. A limpid solution was obtained which was miscible with water.

Example 8

100 parts of a telomer of styrene and maleic anhydride (molecular weight 650–750, molar ratio 1:1) were melted with 40.5 parts of adipic acid, 70 parts of butanediol-(1,4), 30 parts of 1,4-bis[hydroxymethyl]cyclohexane, 0.2 part of manganous acetate and 0.2 par of boric acid triglycol ester and the melt was esterified at 140° C. as described in Example 7. When the acid number of the product had dropped to 90–90 after 6 to 7 hours depending on the stirring speed, the resin was cooled to 80° C., 100 parts of water were added and the pH was adjusted to 7.0–7.5 by aqueous ammonia solution.

Example 9

In a stirring flask 180 parts of a telomer of acrylic acid (molecular weight 400–500), 10 parts of pyromellitic dianhydride, 40 parts of maleic anhydride, 230 parts of hexanediol-(2,5) and 0.2 part of copper acetate were melted and esterified at 150° C. The water formed in the esterification was removed from the reaction vessel by means of a weak nitrogen current. At intervals of 30 minutes samples were taken to determine the acid number. As soon as the acid number had dropped to 120–130° C. the mixture was cooled to 100° C., 200 parts of water were added and the whole was neutralized with a 25% ammonia solution to pH 7.0–7.5. A limpid solution was obtained which could be diluted with water.

Example 10

In a stirring flask 298 parts of a telomer of maleic anhydride and methacrylic acid methyl ester (molar ratio 1:2, molecular weight 500–580) were esterified with 82 parts of adipic acid, 14 parts of glycerol and 140 parts of propanediol-(1,3) by heating at 130° C. The water set free during the esterification was removed from the reaction mixture by a weak nitrogen current. The course of the reaction was controlled by taking samples to determine the acid number. At an acid number of 110–130 the temperature was reduced to 80° C., 250 parts of water were added and the reaction mixture was neutralized to pH 7.0–7.5 by adding a 20% trimethylamine solution. A limpid aqueous solution was obtained.

We claim:
1. A process for the production of polyester resins which comprises the step of reacting, at a temperature within the range of 100° C. to 190° C. until an acid number of 40 to 140 is reached.
   (A) at least one member selected from the group consisting of alcohols containing from 1 to 3 hydroxyl groups, with up to 20% of the hydroxyl groups present in the starting substances originating from alcohols having 1 and 3 to 4 hydroxyl groups,
   (B) a member selected from the group consisting of telomers having a molecular weight of 400 to 2,000 and containing 3 to 12 carboxyl groups, telomers having a molecular weight of 400 to 2,000 and containing carboxylic anhydride groups in an amount corresponding to 3 to 12 carboxyl groups, said telomers being defined as
      (a) a telomer consisting of 3 to 12 structural units of a formula

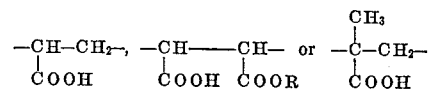

wherein R is derived from an alcohol of 1 to 6 carbon atoms or ethylene glycol monoalkyl ethers having a total of 3 to 6 atoms, and wherein the terminal groups of the telomer are derived of an alkyl benzene telogen, said alkyl benzene being substituted with 1 to 3 alkyl groups having 2 or 3 carbon atoms;

(b) a telomeor consisting of 2 to 6 structural units of a formula

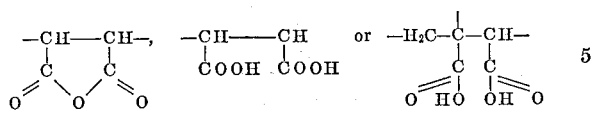

and wherein the terminal groups of the telomer are derived of an alkyl benzene telogen defined in (a);
(c) a telomer consisting of
(1) 3 to 12 structural units of a formula

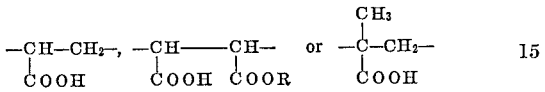

and
(2) structural units of a formula

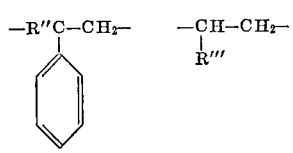

wherein R" is H or —CH$_3$ and wherein R''' is H or an alkyl radical of 1 to 6 carbon atoms, and wherein the terminal groups of the telomer are derived of an alkyl benzene telogen defined in (a);
(d) a telomer consisting of
(1) 2 to 6 structural units of a formula

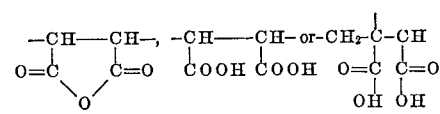

and
(2) structural units of a formula

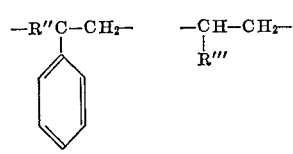

wherein R" is H or —CH$_3$ and wherein R''' is H or an alkyl radical of 1 to 6 carbon atoms, and wherein the terminal groups of the telomer are derived of an alkyl benzene telogen defined in (a), and mixture of said telomers;

(C) at least one member selected from the group consisting of carboxylic acids containing 1 to 4 carboxyl groups and anhydrides of dicarboxylic acids, with up to 20% of the carboxyl groups present in the starting substances originating from carboxylic acids having 1 and 3 to 4 carboxyl groups, the total mixture having the ratio of carboxyl groups to hydroxyl groups within the range of 1:1 to 1:1.5, with 20 to 85% of the carboxyl groups present in the starting substances being contained in the telomers and of the remaining carboxyl groups at least 15% being contained in the dicarboxylic acids or anhydrides thereof said polyester resin being characterized as being capable of dissolving in water when neutralized with ammonia or an amine.

2. A process as claimed in claim 1, wherein a telomer of α-methylstyrene and maleic anhydride (molar ratio 1:1) is reacted.

3. A process as claimed in claim 1, wherein a telomer of styrene and maleic anhydride (molar ratio 1:1) is reacted.

4. A process as claimed in claim 1, wherein a telomer of diisobutylene and maleic anhydride (molar ratio 1:1) is reacted.

5. A process as claimed in claim 1, wherein a telomer of acrylic acid is reacted.

6. A process as claimed in claim 1, wherein a telomer of maleic anhydride and methacrylic acid methyl ester (molar ratio 1:2) is reacted.

7. A process as claimed in claim 1, wherein ethylene glycol is reacted.

8. A process as claimed in claim 1, wherein propanediol-(1,2) is reacted.

9. A process as claimed in claim 1, wherein 2,2-dimethylpropanediol-(1,3) is reacted.

10. A process as claimed in claim 1, wherein butanediol-(1,3) is reacted.

11. A process as claimed in claim 1, wherein butanediol-(1,4) is reacted.

12. A process as claimed in claim 1, wherein hexanediol-(1,5) is reacted.

13. A polyester resin obtained according to the process as claimed in claim 1.

References Cited

UNITED STATES PATENTS 2,561,313  7/1951  Malinowski _____ 260—873
3,067,179  12/1962  Frey _____ 260—75

WILLIAM H. SHORT, *Primary Examiner.*

R. T. LYON, *Assistant Examiner.*